United States Patent
Conduit et al.

(10) Patent No.: US 10,337,330 B2
(45) Date of Patent: Jul. 2, 2019

(54) METHOD OF ASSEMBLING A ROTOR STACK

(71) Applicant: ROLLS-ROYCE plc, London (GB)

(72) Inventors: Bryce D Conduit, Derby (GB); Lorenzo Raffaelli, Sheffield (GB)

(73) Assignee: ROLLS-ROYCE plc, London (GB)

(*) Notice: Subject to any disclaimer, the term of this patent is extended or adjusted under 35 U.S.C. 154(b) by 120 days.

(21) Appl. No.: 15/227,714

(22) Filed: Aug. 3, 2016

(65) Prior Publication Data

US 2017/0058674 A1    Mar. 2, 2017

(30) Foreign Application Priority Data

Aug. 27, 2015  (GB) .................................. 1515192.1

(51) Int. Cl.
*F01D 5/02* (2006.01)

(52) U.S. Cl.
CPC .......... *F01D 5/027* (2013.01); *F05D 2220/32* (2013.01); *F05D 2230/52* (2013.01); *F05D 2260/81* (2013.01); *F05D 2260/96* (2013.01)

(58) Field of Classification Search
CPC . F01D 5/027; F16F 15/20; F16F 15/22; B23P 15/006; F05D 2230/60
See application file for complete search history.

(56) References Cited

U.S. PATENT DOCUMENTS

| | | | | |
|---|---|---|---|---|
| 6,341,419 B1 * | 1/2002 | Forrester | ................. | F01D 5/027 29/889.2 |
| 6,898,547 B1 * | 5/2005 | DeBlois | ................ | F01D 21/003 356/124 |
| 7,539,594 B2 * | 5/2009 | Lee | ......................... | F01D 5/027 702/147 |
| 7,792,600 B2 * | 9/2010 | Borneman | .............. | F01D 5/027 345/418 |
| 7,912,587 B2 * | 3/2011 | Walters | ................... | F01D 5/027 324/154 R |
| 8,631,575 B2 * | 1/2014 | Walters | ................... | F01D 5/027 29/889.21 |

(Continued)

FOREIGN PATENT DOCUMENTS

| | | | |
|---|---|---|---|
| CN | 102354161 A | * | 2/2012 |
| EP | 2 019 185 A2 | | 1/2009 |

(Continued)

OTHER PUBLICATIONS

J. Huang and C. Bi, "An Evaluation Method for Spindle Motor Runout Measurement," in IEEE Transactions on Magnetics, vol. 45, No. 11, pp. 5152-5155, Nov. 2009.*

(Continued)

*Primary Examiner* — Moshe Wilensky
*Assistant Examiner* — Kyle A Cook
(74) *Attorney, Agent, or Firm* — Oliff PLC

(57) ABSTRACT

A method of assembling a rotor stack comprising a plurality of component parts, the method comprising: determining swash measurements for interfacing surfaces of the plurality of parts; calculating a runout estimate for a plurality of relative orientations of the parts; applying an optimization algorithm to identify an optimal orientation from the plurality of relative orientations based on the runout estimates; and assembling the parts in the optimal orientation.

9 Claims, 7 Drawing Sheets

(56) References Cited

U.S. PATENT DOCUMENTS

| | | | |
|---|---|---|---|
| 9,206,692 B2 * | 12/2015 | Calvert | F01D 5/027 |
| 2005/0234576 A1 * | 10/2005 | Lee | F01D 21/003 |
| | | | 700/97 |
| 2008/0075592 A1 | 3/2008 | Lee et al. | |

FOREIGN PATENT DOCUMENTS

| | | |
|---|---|---|
| EP | 2 075 406 A2 | 7/2009 |
| EP | 2 075 407 A2 | 7/2009 |

OTHER PUBLICATIONS

Machine Translation of CN102354161A.*
Mar. 1, 2016 Search Report issued in British Patent Application No. 1515192.1.

* cited by examiner

METHOD OF ASSEMBLING A ROTOR STACK

The disclosure relates to a method of assembling a rotor stack particularly, although not exclusively, for use in a gas turbine engine.

Rotating components must be properly assembled and balanced in order to minimise vibrations. This is particularly important where the components rotate at high speeds, as is the case with the components of a gas turbine engine. In particular, abutting surfaces of component parts may exhibit swash (distortion from a plane normal to the part axis) which can lead to runout (perpendicular distance of the part axis from the central build axis) when the parts are assembled. This issue is exacerbated when a plurality of parts are assembled in a stack.

Usually intermediate measurements are taken during the build process in order to estimate the location of the rotation axis and any mass imbalance generated as the components are joined together. Such measurements therefore allow corrective action to be taken so as to minimise the occurrence of undesired effects. However, the intermediate measurements slow down the assembly process and thus are undesirable.

The disclosure seeks to provide a method which overcomes or alleviates the problems of prior methods.

In accordance with an aspect of the disclosure, there is provided a method of assembling a rotor stack comprising a plurality of component parts, the method comprising: determining swash measurements for interfacing surfaces of the plurality of parts; calculating a runout estimate for a plurality of relative orientations of the parts; applying an optimisation algorithm to identify an optimal orientation from the plurality of relative orientations based on the runout estimates; and assembling the parts in the optimal orientation; wherein at least one of the plurality of parts is selected from an inventory of available parts; and wherein the runout estimate is compared with a threshold value, and if it falls outside of the threshold value, a different combination of parts is selected.

The method may further comprise identifying a plurality of combinations of parts from the inventory of available parts which fall within the threshold value.

A likelihood of success value may be provided based on an uncertainty and the proximity to the threshold.

A message may be generated containing instructions for assembling the parts.

Calculating the runout estimate may comprise estimating deformation of the parts as a function of clamping load.

Calculating the runout estimate may comprise augmenting the swash measurements using a neural network (or another appropriate statistical curve fit) to estimate the contact points between the interfacing surfaces.

The runout estimation and the optimal orientation may be calculated for individual joints and/or the overall stack.

The optimisation algorithm may be modified by user-defined settings.

For a better understanding of the disclosure, and to show more clearly how it may be carried into effect, reference will now be made, by way of example, to the accompanying drawings, in which.

In a gas turbine engine, component parts are connected to one another to form a (rotor) stack which rotates during operation of the engine.

Adjacent parts in the stack are connected to one another via abutting surfaces. For example, the adjacent ends of the parts may each be provided with a flange comprising a plurality of boltholes. The flanges may be brought into contact with one another such that the boltholes of the respective flanges are aligned and are bolted to one another.

Figure 1:
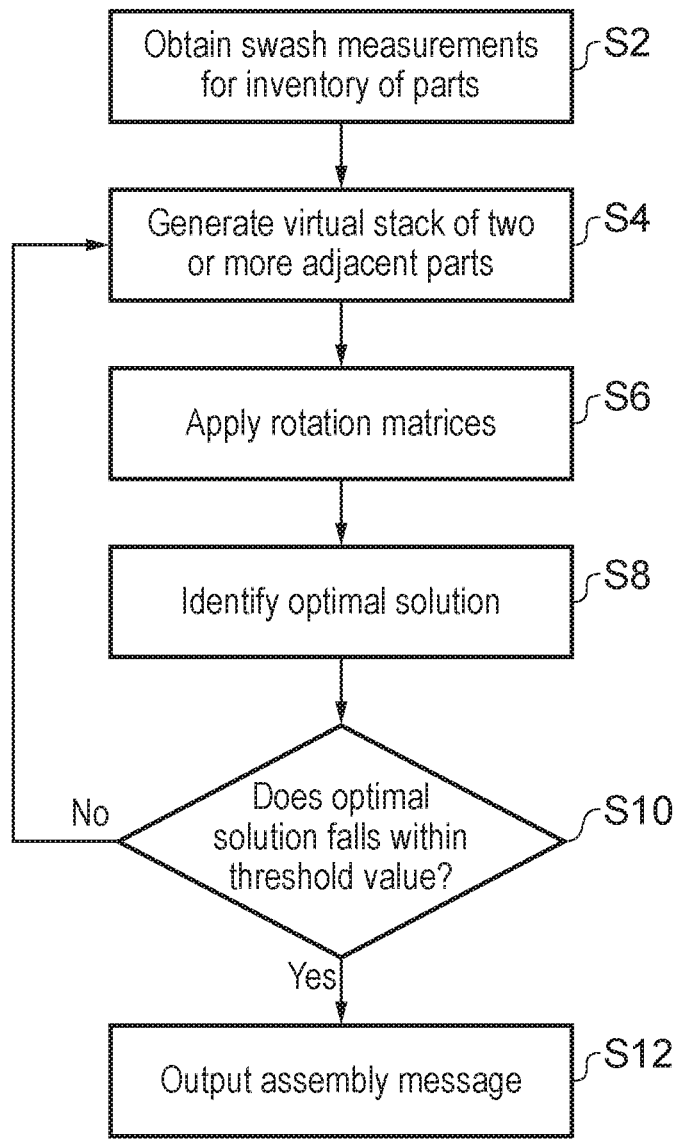
FIG. 1 is a flowchart showing a method according to an aspect of the disclosure.

It will be appreciated that any swash in the abutting flange surfaces will cause runout of the parts. FIG. 1 shows a method of assembling the rotor stack from an inventory of component parts.

In step S2, swash measurements are obtained for each of the components parts in the inventory. These measurements may be taken at the time of manufacturing the parts and/or prior to assembly (i.e. when delivered into stock). Specifically, the abutting surfaces of the parts (e.g. the flanges) are measured to determine any deviations from the proper dimensions generated during manufacturing. These measurements may be stored on a suitable storage medium for subsequent use.

In step S4, a virtual stack of two adjacent parts selected from the inventory of parts is generated using the swash measurements from S2.

The raw swash measurements may be augmented using neural networks or other suitable statistical curve fitting systems to provide an array of x, y, z points describing the possible contact surfaces of each part.

Figure 2:
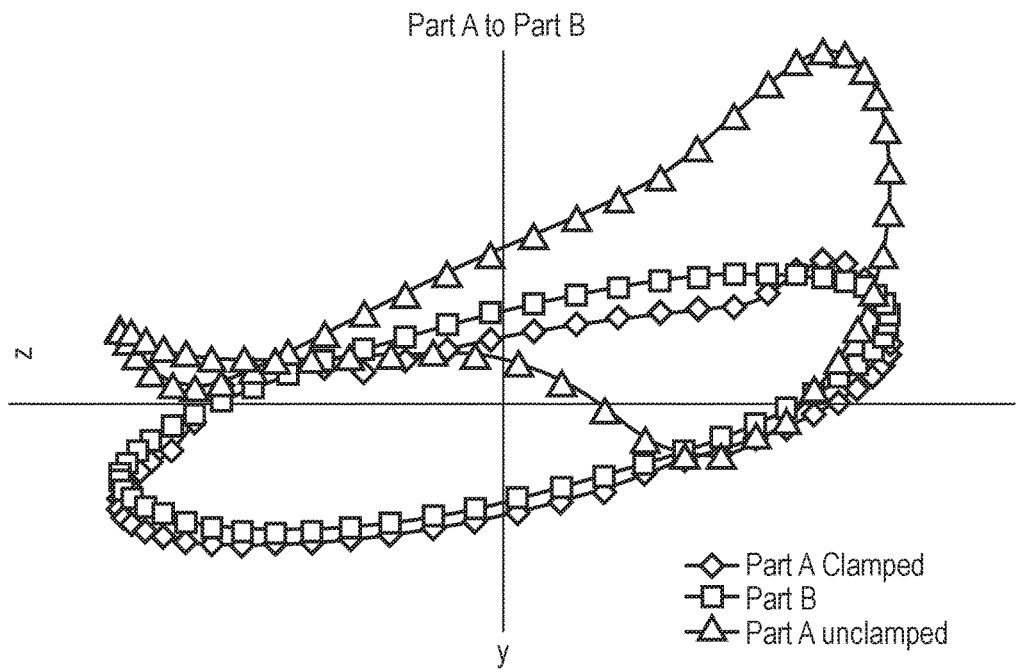
FIG. 2 is a graphical representation of a side view (Y and Z axes) showing the alignment of two parts and the effect of clamping the two parts together.
Figure 3:
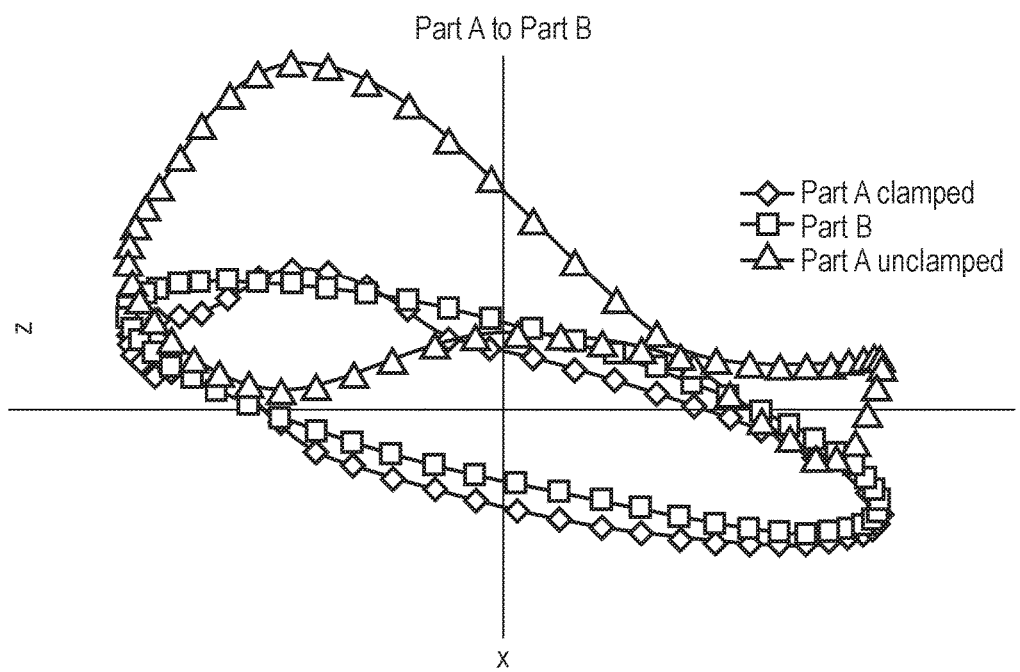
FIG. 3 is a graphical representation of a side view (X and Z axes) showing the alignment of the two parts and the effect of clamping the two parts together.

The virtual stack provides an indication of the runout resulting from the swash associated with the abutting surfaces. The virtual stack takes into account deformation of the abutting surfaces generated by the clamping of the two parts together. For example, as shown in FIGS. 2 and 3, the flange of part A may deviate significantly from the flange of part B. However, the flange of part A is sufficiently flexible that, when clamped, it conforms to the flange of part B. Thus, the initial swash measurements are altered by the deformation of the parts when at the required clamping loads (bolt torques). The user may thus enter the required torque for the bolts or this may be preconfigured. The runout estimation may also take into account the flexibility of the parts along their lengths and any external support of the parts which may limit runout.

A rotation matrix is then applied in step S6, such as the rotation matrix R below:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix}$$

The rotation matrix R changes the relative orientation between the two parts. Specifically, the rotation matrix R adjusts the components of a vector $(u_x, u_y, u_z)$ describing the orientation of a reference plane from which the x, y, z components are defined. The connection between the parts may dictate that only specific orientations are possible. For example, the parts may be assembled in a fixed number of orientations based on the number of boltholes provided in the flanges. The rotation matrix R may thus simulate assembling the parts in every possible orientation. For each position, the runout is again estimated.

The steps S2 to S6 are repeated for each interface in the rotor stack.

In step S8, an optimal solution is identified from the various permutations of the selected parts. In step S10, it is determined whether the optimal solution for the stack of selected parts exhibits runout which falls within acceptable levels.

Figure 4:
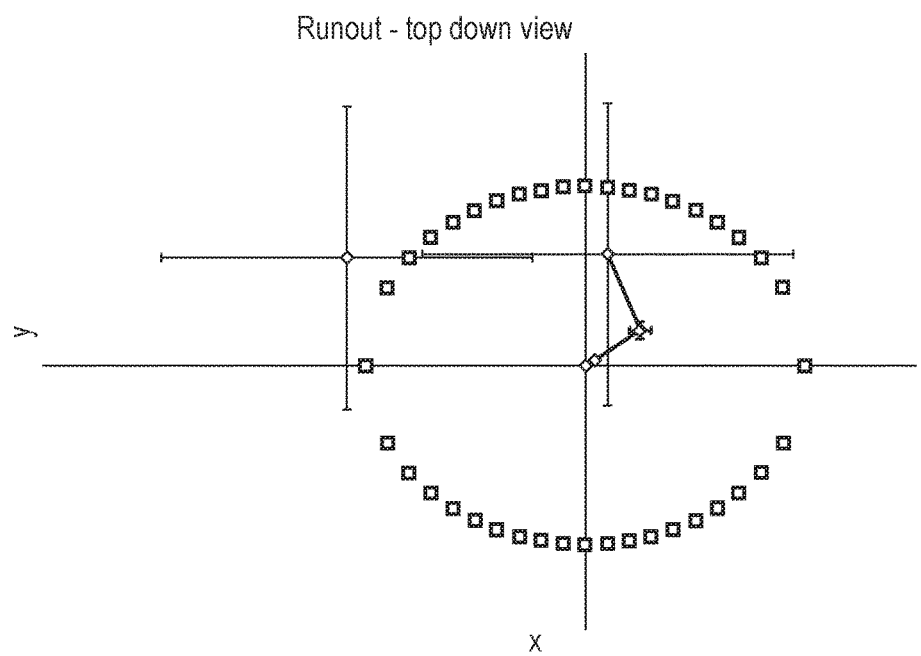
FIG. 4 is a graphical representation showing a top down view of a plurality of parts assembled to one another in a first configuration.
Figure 5:
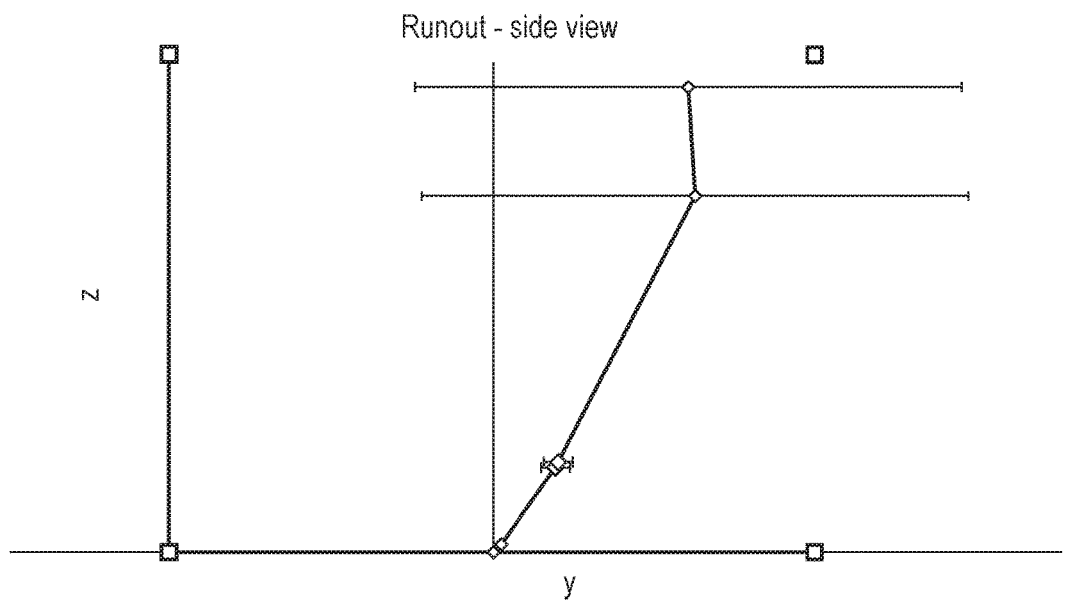
FIG. 5 is a graphical representation of a side view of the plurality of parts showing the accumulated runout in the first configuration.

FIGS. 4 and 5 show the runout for the stack of parts. Specifically, FIG. 4 shows the runout in a top down view. In this Figure, the dotted circle represents a threshold runout for the stack. Each leg of the line shows the runout vector associated with each part, with the dots connecting the lines indicating the rotation axis of each part. FIG. 5 shows the runout in a side view. In a similar manner to FIG. 4, the dotted square (only the four corners are shown) represents a threshold runout for the stack. Again, each leg of the line shows the runout vector associated with each part, with the dots connecting the lines indicating the rotation axis of each part. The accumulated runout must therefore lie within the threshold in order for the stack to be acceptable.

Figure 6:
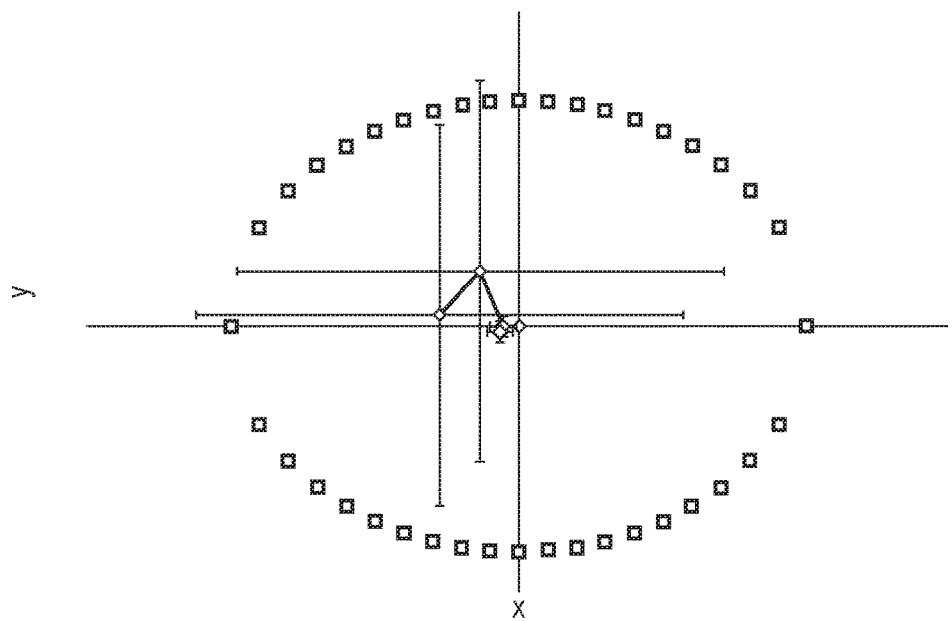
FIG. 6 is a graphical representation showing a top down view of a plurality of parts assembled to one another in a second configuration.
Figure 7:
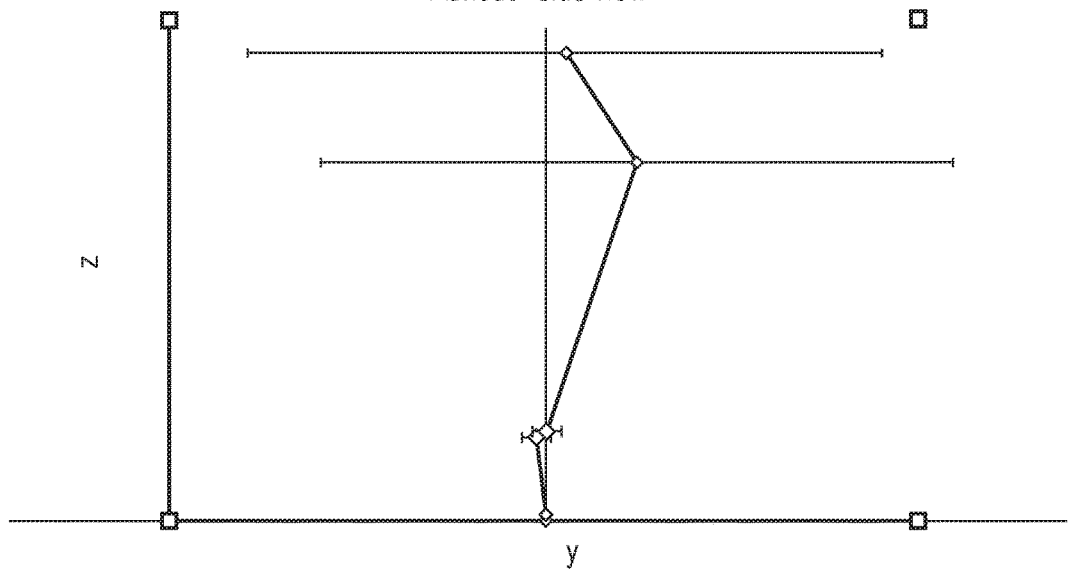
FIG. 7 is a graphical representation of a side view of the plurality of parts showing the accumulated runout in the second configuration.

For the stack shown in FIGS. 4 and 5, although the accumulated runout in the side view falls within the threshold (square) and thus is acceptable, in the top down view, the accumulated runout falls outside of the threshold (circle) and thus is not acceptable.

Where the optimal solution still lies outside of the acceptable runout threshold, steps S2 to S10 are repeated for a different selection of parts until an acceptable selection of parts are generated. For example, FIGS. 6 and 7 show the accumulated runout for a second selection of parts which falls within the thresholds and thus is acceptable.

As shown in FIGS. 4 to 7, there is an accumulated uncertainty at each position in the virtual stack. Thus, even where the accumulated runout lies within the thresholds, the uncertainty may lead to unacceptable results in practice. Accordingly, a likelihood of success value may also be provided based on the uncertainty and the proximity to the threshold.

The method may also provide an estimation of the vibration exhibited by the rotor during operation of the engine.

Once an acceptable selection of parts is generated, a message (or other notification) is generated at S12 which identifies (using a part number or the like) the required parts for the stack and instructions for assembling the parts (i.e. their relative orientations). The stack can therefore be assembled without any intermediate measurements, thus reducing the assembly time.

The process may be repeated to identify a plurality of acceptable rotor stacks which may be assembled using the available inventory of parts. The method may be optimised in order to maximise the number of rotor stacks which can be manufactured from the available parts. The method may also identify parts which cannot yet be used based on the available parts for the other positions in the stack.

The optimisation algorithm may be setup to achieve a pre-defined balance between snugness of fit between the two components (characterised by standard deviation of the gap between them) and the runout that Part B produces relative to Part A. The correct balance may be defined by vibration dynamics considerations, which take into account the locations of bearings, mass distributions or other physical factors. The optimisation may also take into account the different operating conditions of the engine. Considerations of alignment include bearing alignment, mass distribution, runout, swash, blade tip rub, vibration modes etc. The optimisation of the whole rotor stack thus need not be based solely on absolute runout of the stack and may be optimised for other attributes, which may be selected by a user. For example, a part within the stack may be housed by a bearing and thus a larger amount of overall runout may be accepted in order to reduce the runout at this part, thereby reducing wear of the bearing.

Figure 8:
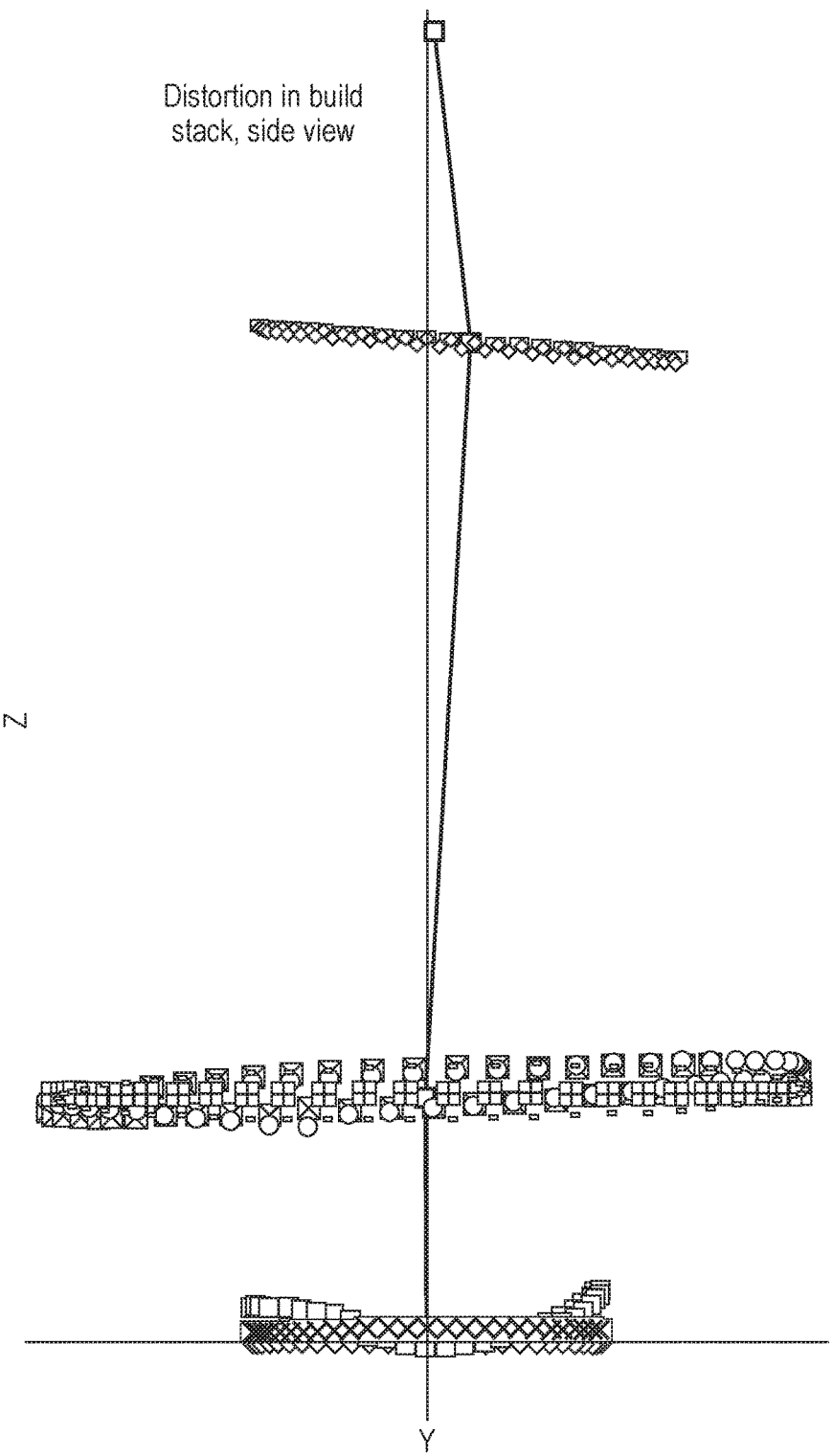
FIG. 8 is a graphical representation of a side view (Y and Z axes) showing the distortion of the plurality of parts when in the second configuration.
Figure 9:
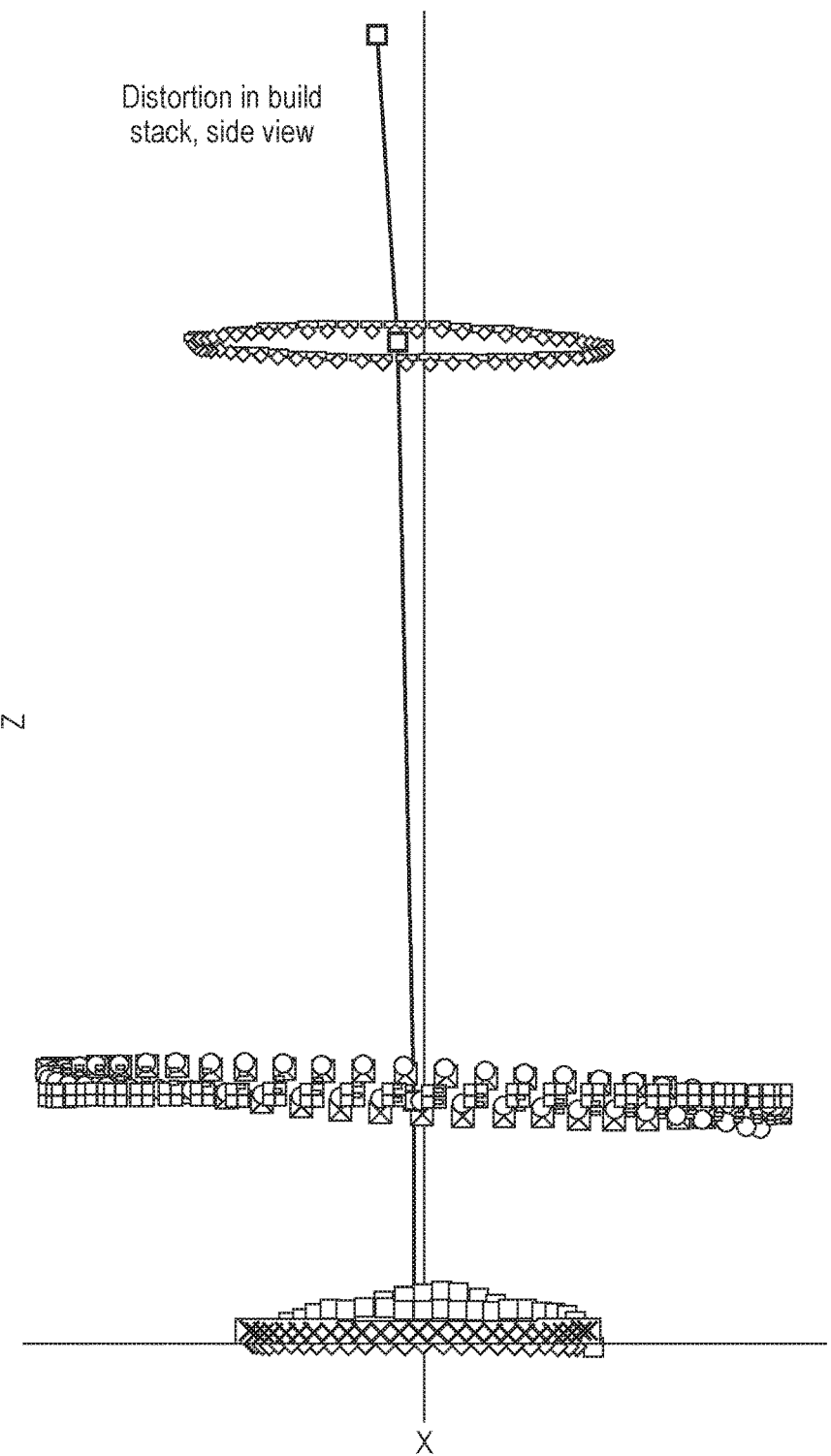
FIG. 9 is a graphical representation of a side view (X and Z axes) showing the distortion of the plurality of parts when in the second configuration.
Figure 10:
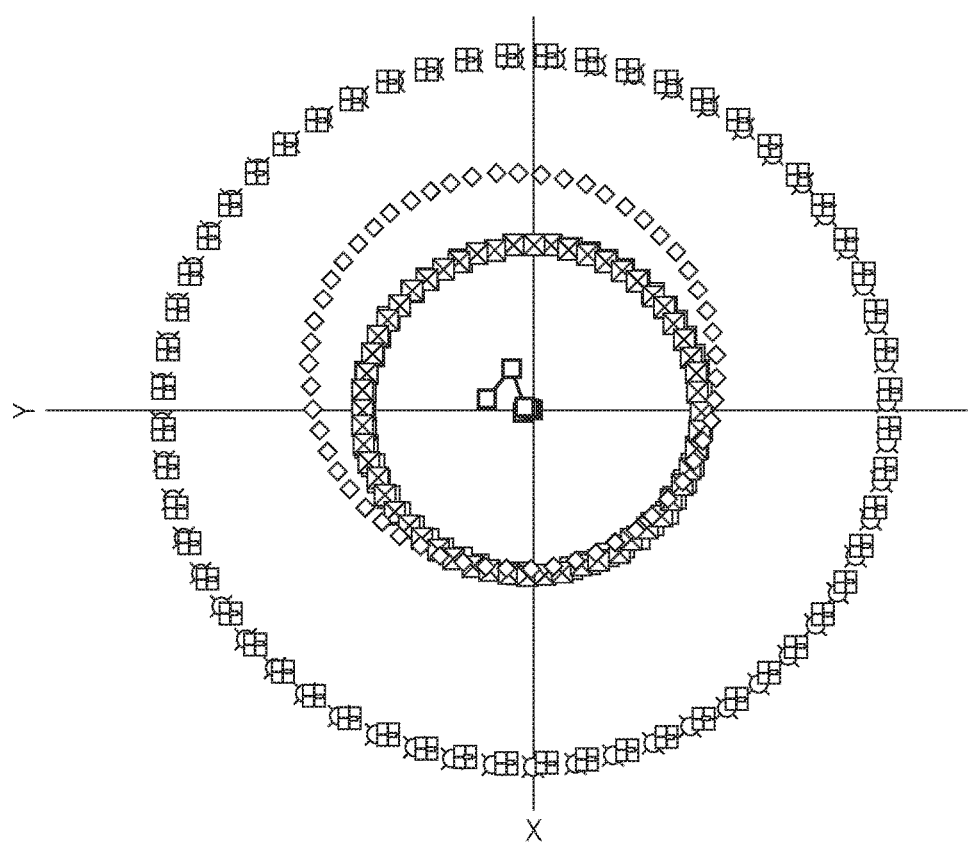
FIG. 10 is a graphical representation showing a top down view showing the distortion of the plurality of parts when in the second configuration.

FIGS. 8 to 10 show the deformation of the parts in the stack when assembled to one another.

In order to estimate the deformation between the parts, the contact points (calculated from the neural network) between the two mating surfaces are identified by finding the minimum gap location when the first derivative of the gap function changes sign from negative to positive. The clamping deformation is calculated through finite element analysis under the prescribed assembly loads (a statistical approach can be used to account for uncertainties in the joint) and then applied to the curve fitted on the mating surfaces of the parts as a function of the distance from the closest contact point. The deformation imposed by the clamping load cannot be larger than the initial surfaces' distance; once the gap is closed under clamping load the two surfaces are in contact and so further deformation is not allowed. The actual deformation of the mating surfaces is then applied on the following joint surface of the component through deformation correlations from computer finite element analysis which thus has a knock-on effect on the swash and concentricity of the mating surfaces of the next joint. This is repeated for each joint in the stack. To improve accuracy, an elastic microstructure deformation model which takes into account individual grain orientation may be utilised.

Although the method has been described with reference to a rotor of a gas turbine engine, it may have uses in any turbo-machinery and also other applications. In particular, the method could be used for any precision alignment operation whereby the parts are precision measured, the aim of the alignment operation is known and there is some form of existing adjustment. Possible examples could include gearboxes, marine Z drive, turbochargers, etc.

In any of the above aspects, the various features may be implemented in hardware, or as software modules running on one or more processors. Features of one aspect may be applied to any of the other aspects.

There may also be provided a computer program or a computer program product for carrying out any of the methods described herein, and a computer readable medium having stored thereon a program for carrying out any of the methods described herein. A computer program may be stored on a computer-readable medium, or it could, for example, be in the form of a signal such as a downloadable data signal provided from an Internet website, or it could be in any other form.

The invention claimed is:

1. A method of assembling a rotor stack comprising a plurality of component parts, the method comprising:
    (A) measuring swash of abutting surfaces of the plurality of parts;
    (B) calculating a runout estimate for a plurality of relative orientations of the parts, including selecting a clamping load and estimating deformation of the abutting surfaces of the parts as a function of the clamping load;
    (C) applying an optimization algorithm to identify an optimal orientation from the plurality of relative orientations based on the runout estimates;
    (D) comparing the runout estimate corresponding to the optimal orientation with a threshold and repeating steps (A)-(D) with a different combination of parts if the runout estimate falls outside of the threshold; and
    assembling the parts in the optimal orientation when the runout estimate corresponding to the optimal orientation falls within the threshold.

2. The method as claimed in claim 1, further comprising identifying a plurality of combinations of available parts which falls within the threshold.

3. The method as claimed in claim 1, wherein a likelihood of success value is provided based on an uncertainty and a proximity to the threshold.

4. The method as claimed in claim 2, wherein a likelihood of success value is provided based on an uncertainty and a proximity to the threshold.

5. The method as claimed in claim 1, wherein a message is generated containing instructions for assembling the parts.

6. The method as claimed in claim 1, wherein calculating the runout estimate further comprises augmenting the swash measurements using a neural network to estimate the contact points between the abutting surfaces.

7. The method as claimed in claim 1, wherein the runout estimation and the optimal orientation are calculated for individual joints and/or the overall stack.

8. The method as claimed in claim 1, wherein the optimisation algorithm is modified by user-defined settings.

9. The method as claimed in claim 1, wherein an optimisation goal is defined by vibration dynamics considerations.

* * * * *